(No Model.) 2 Sheets—Sheet 1.
I. T. EVANS.
DRAG HARROW.
No. 586,549. Patented July 20, 1897.
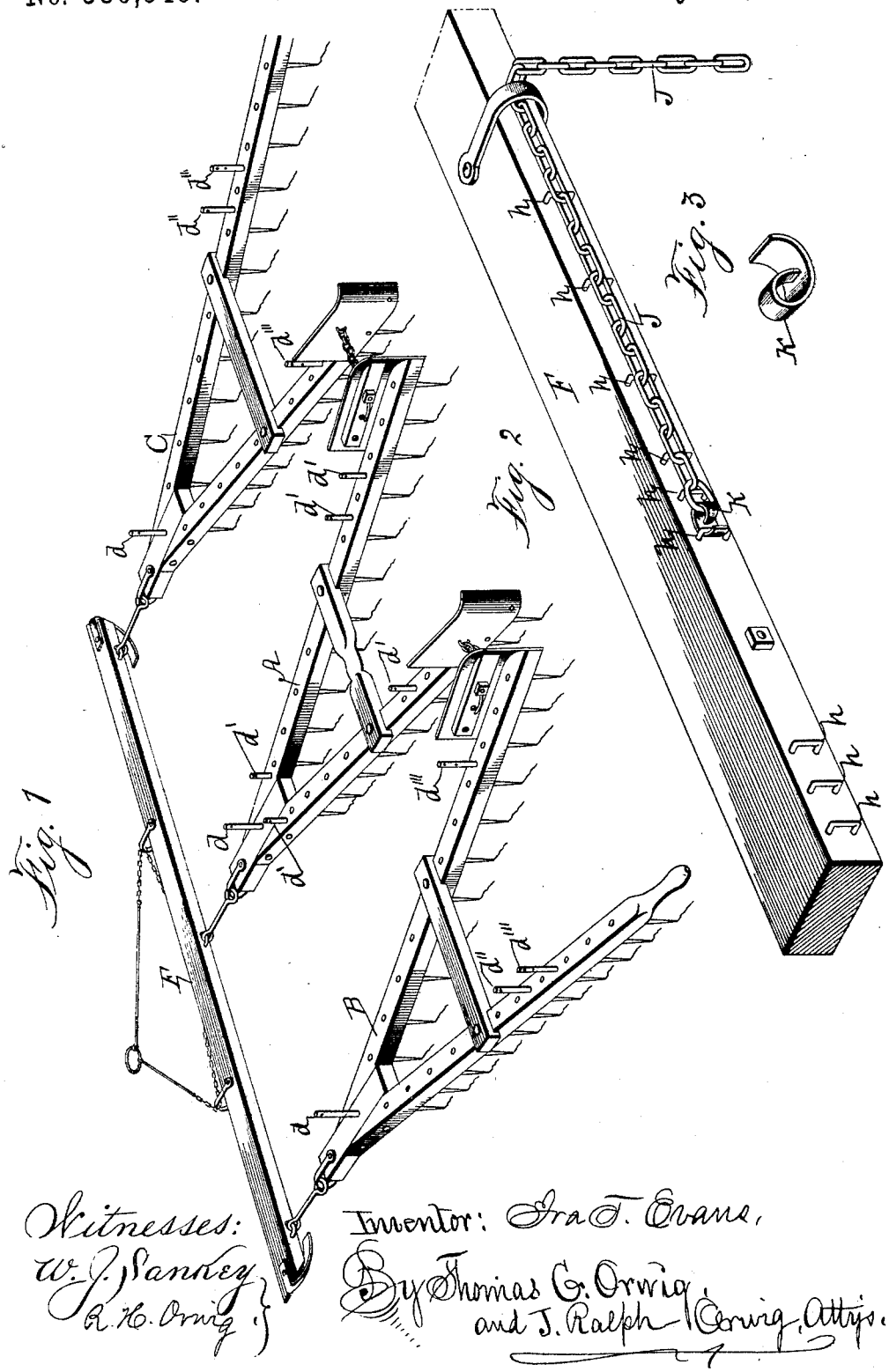
Witnesses:
W. J. Sankey
R. H. Orwig
Inventor: Ira T. Evans,
By Thomas G. Orwig
and J. Ralph Orwig, Attys.

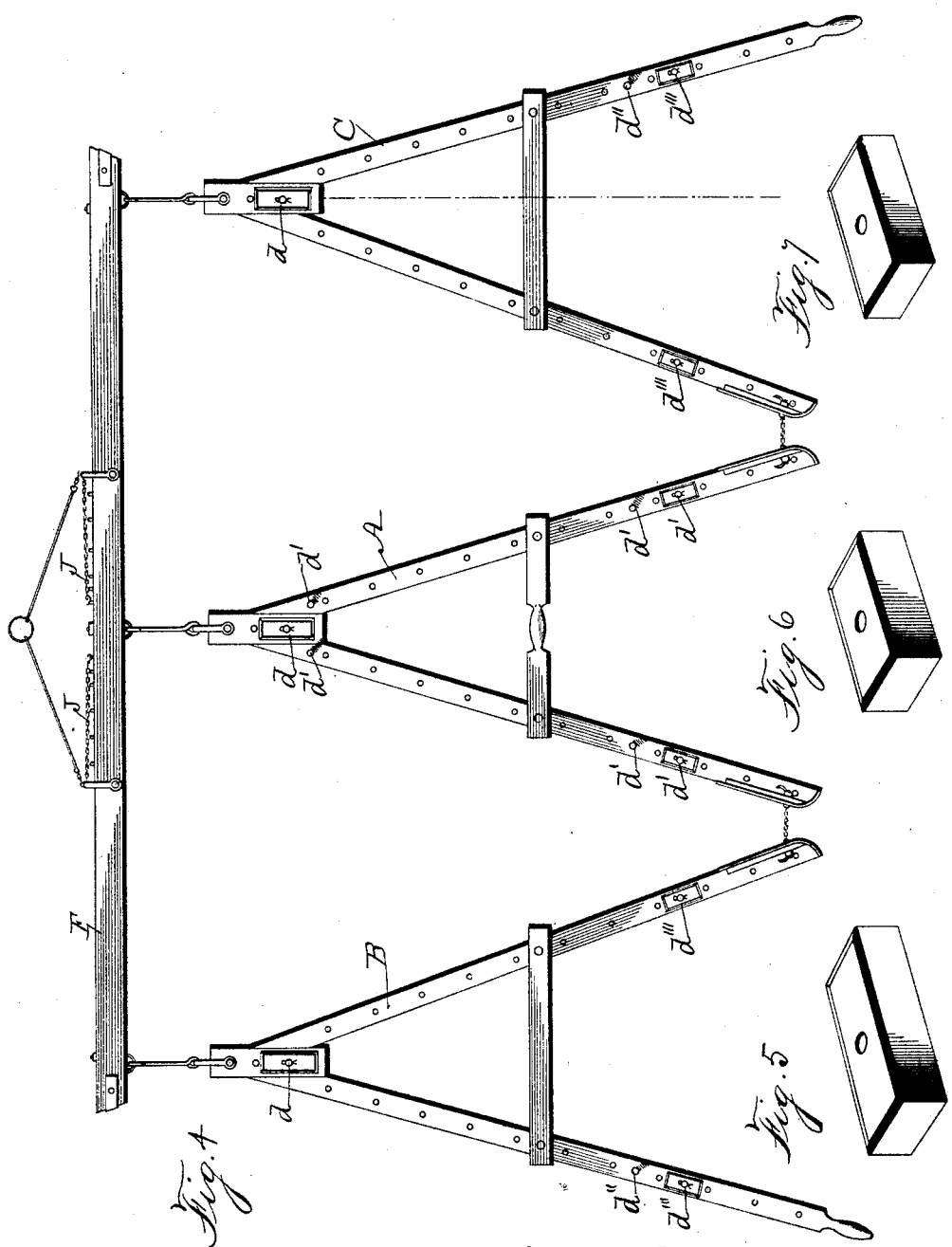

UNITED STATES PATENT OFFICE.

IRA T. EVANS, OF CLIVE, IOWA.

DRAG-HARROW.

SPECIFICATION forming part of Letters Patent No. 586,549, dated July 20, 1897.

Application filed December 4, 1896. Serial No. 614,518. (No model.)

*To all whom it may concern:*

Be it known that I, IRA T. EVANS, a citizen of the United States of America, residing at Clive, in the county of Polk and State of Iowa, have invented an Improved Drag-Harrow, of which the following is a specification.

My object is, first, to provide means for controlling the lateral motions of the harrow-sections relative to each other, as required, to advance on ridges or in furrows and on side hills; second, to control the pointed front ends of the sections, as required, to advance in furrows and on hard ground and not slip over portions of the ground without sinking the teeth and stirring the soil; third, to facilitate the adjustment of the drag-bar, as required, to regulate the vibrations of the harrow-sections; fourth, to detachably fasten interchangeable weights of different sizes to the harrow-sections at different points to adapt the complete harrow for a wide range of work, as required, in cleaning and preparing ground for the reception of seed and in cultivating the soil before the plants have appeared above ground and also after the plants have attained some standing above ground.

My invention relates to the harrow described in Patents Nos. 210,311 and 531,308; and it consists in the arrangement and combination of parts as hereinafter set forth, pointed out in my claims, and illustrated in the accompanying drawings, in which—

Figure 1 is a top view of the complete harrow, showing the two outside harrow-sections wider at their rear ends than the central section, and their teeth-bearing bars at different angles relative to a straight line extending rearward through the centers of their front ends. Fig. 2 is a perspective view showing means for fastening, interchangeably, weights thereon at different points of the harrow-sections. Fig. 3 is an enlarged perspective view of a portion of the drag-bar and a drag-chain adjustably connected therewith. Fig. 4 is a perspective view of an open link adapted for detachably fastening the chain to the drag-bar and to facilitate the adjustment of the chain, as required, to lengthen and shorten the space between the drag-bar and the horses hitched thereto by means of the chains, so as to regulate the vertical vibrations of the harrow-sections connected with the drag-bar. Fig. 5 represents a weight made of cast metal and provided with a central vertical bore adapting it to be placed on a pin fixed to a harrow-section and detachably fastened thereto, as hereinafter set forth. The weight is about twelve pounds. Fig. 6 represents a weight of corresponding form of about six pounds. Fig. 7 shows a medium weight of about eight pounds and corresponding form with the heavy and light weights, as required, to be interchangeably used therewith in connecting them with fixed pins on the harrow-sections.

The harrow-sections are marked, respectively, A, B, and C. The central section A is two feet and ten inches wide at its rear end. The outside sections are three feet wide at their rear ends. Their front pointed ends are equal distances apart, so that the complete harrow is adapted to stride three parallel rows of plants that are equidistant from each other. The spaces between the rear ends or heels of the outside sections and the rear ends of the central section allow the sections to advance parallel with the rows of plants without coming in contact with the plants when the harrow is used for cultivating plants, and when used for preparing ground and gathering cornstalks and rubbish into rows the rows will be located on the said spaces between the heels.

Heretofore when the harrow-sections were all of equal width and the tooth-bearing bars at equal angles relative to a straight line lengthwise through their centers the heels of the outside sections moved toward the central section, so that vacant spaces could not be maintained at all times between the said heels as the harrow was advanced and the teeth of the outside sections would not be equidistant, and consequently the ground would be made finer by the teeth of one bar than by the teeth of the other bar in each of the two outside harrow-sections.

By placing the tooth-bearing bars of the two outside sections B and C at different angles relative to a central line extended from their pointed front ends rearward these sections will naturally adjust themselves relative to their central lines of advance, so that the rear ends of their tooth-bearing bars will be equidistant from said central lines, and consequently the outside sections B and C will have a tendency to move outward at their rear ends, as required, to retain all the teeth equidistant to make the ground uniformly fine and to maintain vacant spaces between the heels of the sections and to allow cornstalks and rubbish to be gathered in rows upon said spaces.

The pointed front end of each harrow-section A B C has a fixed pin $d$, adapted for fastening a heavy weight thereon to depress the front ends, as required, to stir the ground in furrows and to penetrate hard ground. $d'$ are pins fixed to the section A and in rear of the pin $d$ for fastening light weights thereon. $d''$ are pins fixed to the sections B and C to connect medium weights therewith. $d'''$ are pins fixed to the sections B and C in rear of the pins $d''$ and adapted for connecting light and medium weights interchangeably therewith.

Each tooth-bearing bar of each section A B C has a fixed pin $d'''$ at its rear end portion adapted for fastening light weights or medium weights thereon at pleasure. Transverse perforations in the top portions of said pins and at different points of elevation allow keys to be inserted above the tops of the weights, as shown in Fig. 1, to retain weights thereon.

F is the drag-bar to which a series of staples $h$ are fixed to its front edge, as shown in Fig. 3, and the spaces between the staples graduated, so that the drag-chains J can be readily lengthened and shortened by connecting their rear ends with the staples by means of open links specially adapted therefor. The staples $h$ are closest together at the central portion of the drag-bar to suit chains differing in length.

K (clearly shown in Fig. 4) is an open link made by bending a tapering piece of plate metal or casting it in a mold in such a manner that it will be of convolute shape, and the large end adapted to clasp fast a staple $h$ and the small end adapted to hook fast in the end link of a chain.

In the practical use of my invention the heavy weights are placed on the pins $d$ and the light weights and medium are interchangeably fastened on the pins $d'$ and $d''$, as hereinafter set forth, to control the harrow-sections A B C on different kinds of ground and for different purposes.

For the purpose of cleaning three parallel spaces of plowed ground in which rows of corn or other seed has been planted I place the heaviest weights on the front pins $d$, and if the ground is covered with cornstalks or other removable obstructions I place a light weight on the rear outside pins $d'''$ and a medium weight on the rear inside pin $d'''$ in order to maintain open spaces between the heels of the harrows to allow them to cast off cornstalks, &c., into rows between them as they are advanced in the field. To retain the heels closer together, I simply reverse the positions of the weights on the rear pins of the two outside harrow-sections. The side motions of the harrow-sections are thus produced by means of the unequal pressure of the weights, so that when the medium weights are on the inside the harrow-teeth on that side are pressed deeper into the ground and produce a side draft that moves the sections outward, and when the medium weights are on the outside a reverse action occurs, as required, to retain the heels of the sections closer together.

When the tooth-bars of the outside sections are extended rearward at different angles relative to their lines of draft, as shown in Fig. 1 and as required to prevent outward movement and separation of the heels, it is sometimes desirable to retain the heels closer together, and to overcome such outward movement and to retain the sections balanced I place a medium weight on the rear pins $d'''$ of the outside bars of each outside section. The bars will then move forward at equal distances apart, as required, to stir the ground uniformly the entire width of each section.

To prevent the harrow-sections from slipping downward while advancing along the side of a hill, I place two medium weights on the two rear pins $d'$ and $d''$ on the lower side of the two outside harrow-sections and, if required, retain both small weights on the pins $d'$ $d'$ on the lower side of central section A and retain only one light weight on the elevated sides of the sections, so as to produce the greatest pressure on the low sides of the sections in central positions relative to rows of corn and at equal distances relative to the center of the line of advance.

To depress the front and pointed ends of the harrow-sections, as required, to operate the teeth in furrows and to sink into hard ground, I place the heavy weights on the pins $d$ at the front ends of the sections and remove all the weights, or as many of them as may be required, from the rear portions of the sections A B C.

To operate the harrow on level and more mellow ground, I place a medium weight on the front pin $d$ of each outside section and a light weight on each of the rear outside pins $d''$ of the outside sections and light weights on the front pins $d'$ of the center section A when the heels are to be kept closer together and reverse their positions on the rear ends of the outside sections when the heels are to be kept separated and open as required to retain space for rows of cornstalks, &c, gathered as the harrow is advanced to clean the surface as well as stir the ground.

To run harrow-sections in furrows, remove weights in the rear, as many as required, and place heavy weights on the front pins $d$ of the sections and adjust the drag-chains J on the drag-bar F, as required, to use the maximum length of the chains J.

When the complete harrow is placed on ridges in which rows of corn have been planted, it is obvious that when the medium weights are placed on the pins $d'''$ on the outside bars of the sections B and C and light weights on the pins $d'''$ of the inside bars of the said sections the outside sections B and C will slide outward and away from the central section A, so that the chains connecting the rear ends of the sections will be stretched and the central section steadied by the outward movements of the sections B and C, as required, to advance the three sections advantageously on the three distinct ridges and rows of corn therein.

I claim as my invention—

1. An improved drag-harrow comprising three V-shaped harrow-sections connected at their front and pointed ends with a drag-bar, the center section narrower at its rear end than the two outside sections, and its tooth-bearing bars at equal angles relative to a central line extending through the center of the front end rearward, and the two outside sections having their tooth-bearing bars at different angles relative to central lines extending through their front ends rearward, and the inner bars of the outside sections connected with the bars of the central section, by means of chains, to operate in the manner set forth for the purposes stated.

2. A drag-bar for harrows having staples fixed in its front edge, clevises at its ends, chains extended through the clevises and provided at their ends with open links of convolute shape adapted to be detachably fastened to the fixed staples in the manner set forth for the purposes stated.

IRA T. EVANS.

Witnesses:
J. RALPH ORWIG,
THOMAS G. ORWIG.